US010255446B2

(12) United States Patent
Brooks et al.

(10) Patent No.: US 10,255,446 B2
(45) Date of Patent: Apr. 9, 2019

(54) CLIPBOARD MANAGEMENT

(71) Applicant: BlackBerry Limited, Waterloo (CA)

(72) Inventors: Simon Brooks, New Malden (GB); Siavash James Joorabchian Hawkins, London (GB); Christopher Rankin, Surrey (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/793,115

(22) Filed: Jul. 7, 2015

(65) Prior Publication Data
US 2015/0310220 A1 Oct. 29, 2015

Related U.S. Application Data

(63) Continuation of application No. PCT/US2014/010559, filed on Jan. 7, 2014.
(Continued)

(51) Int. Cl.
*G06F 21/60* (2013.01)
*G06F 9/54* (2006.01)

(52) U.S. Cl.
CPC ............ *G06F 21/606* (2013.01); *G06F 9/543* (2013.01)

(58) Field of Classification Search
CPC ....... G06F 21/604; G06F 21/606; G06F 9/543
(Continued)

(56) References Cited

U.S. PATENT DOCUMENTS

2003/0200459 A1* 10/2003 Seeman ................. G06F 21/10
726/26
2004/0153974 A1* 8/2004 Walker, Jr. .............. G06F 9/543
715/210
(Continued)

FOREIGN PATENT DOCUMENTS

CN 1708751 12/2005
CN 1783038 6/2006
(Continued)

OTHER PUBLICATIONS

Machado, Use of the smartphone application "Food Safe Surveys" for Data Collection during Direct Concealed Observations, 2005, Penn State University, p. 357-364 (Year: 2005).*
(Continued)

*Primary Examiner* — Taghi T Arani
*Assistant Examiner* — Gregory A Lane
(74) *Attorney, Agent, or Firm* — Fish & Richardson P.C.

(57) ABSTRACT

Embodiments provide methods, devices and computer program arranged to control access to clipboards by applications. In one embodiment a user device comprises: at least one processor; and at least one memory comprising computer program code and an application that has been provisioned by an application provisioning entity, the application having access to a first clipboard of a first type, to which data can be transferred and/or from which data can be retrieved by a further, different, application on the user device, wherein the application is configured with an encryption key for the transfer of data to and/or retrieval of data from a second clipboard of a second, type, clipboard, the encryption key being associated with the application provisioning entity. The user device can control the transfer of data to and/or retrieval of data from the second clipboard by the application via the encryption key.

18 Claims, 11 Drawing Sheets

Related U.S. Application Data

(60) Provisional application No. 61/750,108, filed on Jan. 8, 2013.

(58) Field of Classification Search
USPC .......................................... 713/189; 715/770
See application file for complete search history.

(56) References Cited

U.S. PATENT DOCUMENTS

| | | | |
|---|---|---|---|
| 2006/0101422 A1* | 5/2006 | Bourges-Waldegg | G06F 9/548 717/136 |
| 2006/0117178 A1* | 6/2006 | Miyamoto | G06F 21/556 713/165 |
| 2007/0016771 A1* | 1/2007 | Allison | G06F 21/6209 713/165 |
| 2007/0157203 A1* | 7/2007 | Lim | G06F 9/468 718/100 |
| 2008/0282180 A1* | 11/2008 | Glasgow | G06F 9/543 715/770 |
| 2009/0319671 A1* | 12/2009 | Richardson | H04L 67/08 709/227 |
| 2009/0319909 A1* | 12/2009 | Hsueh | G06F 9/543 715/740 |
| 2009/0328033 A1 | 12/2009 | Kohavi et al. | |
| 2010/0146127 A1* | 6/2010 | Schmieder | G06F 9/545 709/228 |
| 2011/0276699 A1* | 11/2011 | Pedersen | H04L 45/24 709/227 |
| 2012/0066691 A1* | 3/2012 | Branton | G06F 9/543 719/312 |
| 2012/0096368 A1* | 4/2012 | McDowell | G06F 9/543 715/748 |
| 2012/0110486 A1 | 5/2012 | Sirpal et al. | |
| 2012/0226913 A1 | 9/2012 | Park et al. | |
| 2012/0289290 A1 | 11/2012 | Chae et al. | |

FOREIGN PATENT DOCUMENTS

| | | |
|---|---|---|
| EP | 1662356 | 5/2006 |
| EP | 2428894 | 3/2012 |

OTHER PUBLICATIONS

Extended European Search Report issued in European Application No. 14738085.1 dated Aug. 16, 2016.
Written Opinion issued in international Application No. PCT/US2014/010559 dated Jun. 3, 2014.
International Search Report dated Jun. 3, 2014 for related application No. PCT/US2014/010559 filed Jan. 7, 2014 and published as WO/2014/110057 on Jul. 17, 2014.
Chinese Office Action in Chinese Application No. 201480004202.1 dated Jan. 30, 2018, 53 pages.
Chinese Office Action in Chinese Application No. 201480004202.1 dated Aug. 29, 2018, 38 pages.
Communication under Rule 71(3) EPC issued in European Application No. 14738085.1 dated May 25, 2018.

* cited by examiner

CLIPBOARD MANAGEMENT

CROSS-REFERENCE TO RELATED APPLICATIONS

This application is a continuation under 35 U.S.C. § 120 of International Application No. PCT/US2014/010559, filed Jan. 7, 2014 (and published in English by the International Bureau as International Publication No. WO/2014/110057 on Jul. 17, 2014), which claims the benefit of U.S. Provisional Patent Application No. 61/750,108, filed Jan. 8, 2013. The entire contents of the above-referenced patent applications are hereby incorporated by reference.

BACKGROUND OF THE INVENTION

The present invention relates to clipboards, and provides methods, systems and computer programs for controlling access to clipboards by applications on user devices.

Clipboards, or pasteboards, allow an application or a user thereof to transfer data by means of a cut or copy clipboard operation to a temporary location for retrieval by means of a paste operation into the same application or a different application. In particular, clipboards temporarily retain data for internal use by an application or for sharing with other applications. The main or system clipboard is typically an open clipboard that is accessible by most of the applications on a user device, and accordingly sensitive or confidential information that is placed on the clipboard may be accessed by an unauthorized application, thereby posing a risk of data leak.

To address this issue, many enterprises prevent clipboard access from applications having access to confidential information. However, such measures completely disable clipboard functionality and, as a result, are an annoyance to users who are accustomed to using clipboard functions.

In an alternative arrangement, an application may encrypt data that is placed on the system clipboard, which enables clipboard access for internal purposes, but prevents other applications from accessing its unencrypted clipboard data. However, because the encrypted data is placed on the open access clipboard, it is at risk of being removed or overwritten by another application on the system with access to the clipboard, which may lead to data loss.

In a further alternative arrangement, an operating system such as Apple™ iOS may provide a private clipboard that can be invoked by any application. Each private clipboard is assigned a unique identifier by the invoking application, and access to a given private clipboard is restricted to applications that have knowledge of the corresponding unique identifier, thereby enabling applications to share sensitive information. However, data on a private clipboard may be exposed to an unauthorized application if that application discovers the relevant identifier.

It is an objective of the present invention to provide improved methods for managing access to clipboards.

SUMMARY

In accordance with aspects of the present invention, there is provided methods and an apparatus for controlling clipboard operations on a user device according to the appended claims.

In a first exemplary embodiment there is provided a user device comprising: at least one processor; and at least one memory comprising computer program code and an application that has been provisioned by an application provisioning entity, the application having access to a first clipboard of a first type, to which data can be transferred and/or from which data can be retrieved by a further, different, application on the user device, wherein the application is configured with an encryption key for the transfer of data to and/or retrieval of data from a second clipboard of a second, different, type, the encryption key being associated with the application provisioning entity, the at least one memory and the computer program code being configured to, with the at least one processor, cause the user device to control the transfer of data to and/or retrieval of data from the second clipboard by the application via the encryption key.

In embodiments described herein the first clipboard may be an unrestricted or open clipboard that is accessible by at least some of the other applications on the user device, while the second clipboard may be a restricted clipboard that is only accessible by the application. Thus, in the examples described in the present disclosure, the term "type" refers generally to levels of restriction assigned to the application when accessing a clipboard. The terms unrestricted/open clipboard and first clipboard will be used interchangeably, and the terms restricted clipboard and second clipboard will be used interchangeably in the disclosure.

Accordingly, in addition to having access to an unrestricted or open clipboard that is accessible by at least some of the other applications on the user device, the first embodiment enables an application to access a restricted clipboard that is exclusively reserved for use by the application. The application is configured with an encryption key for transfer of data to and retrieval of data from the restricted clipboard, thus mitigating any risks of data loss and data leakage.

In a first arrangement, the application can execute in a foreground operational state and a background operational state. In such arrangements, in response to an indication that the application is transiting into the background operational state, the application may associate an identifier with the encrypted data placed on the restricted clipboard and may transfer the encrypted data to the open clipboard on the basis of a predetermined rule, thereby enabling retrieval of the encrypted application when the application transits into the foreground operational state and/or retrieval of data by a different application.

In a second arrangement, responsive to an indication that the application has transited into the foreground operational state, the application may retrieve a data item from the open clipboard, which may have been placed on the open clipboard by the application when it transited into the background operational state or by a different application. The application may determine whether the retrieved data item has been encrypted on the basis of the encryption key, encrypt the retrieved data item on the basis of the encryption key if it has not been encrypted and transfer the encrypted data item to the restricted clipboard. Thus, this arrangement enables the application to securely maintain data items on the open clipboard while the application is in the background operational state and/or enable retrieval of data by another application. In addition, any items maintained on the restricted clipboard are encrypted on the basis of the encryption key, thereby mitigating risk of a data leak.

In a third arrangement, the application may have access to a third and/or a fourth clipboard of the second type, which may both be accessible via a different key. For example, the third clipboard may be accessible via a user key associated with a user and the fourth clipboard may be accessible via a provisioning key associated with an application provisioning repository from which the application was downloaded. In effect, this arrangement provides clipboards associated with a context, and the application may determine which of the clipboards are accessible and select one of the accessible clipboards on the basis of a predetermined criterion, which may, for example, be a policy specified by the aforementioned application provisioning entity.

In an alternative arrangement, the second, the third and/or the fourth clipboards may be accessible by a further, different application on the user device. In this case, the further application will be configured with one or more of the encryption key, the user key and the provisioning key, and will be configured to transfer to and/or retrieve data from the accessible ones of the second, third and/or fourth clipboards via the corresponding key. Accordingly, this arrangement provides a restricted clipboard that is accessible by applications sharing a contextual relationship, such as applications provisioned by the application provisioning entity and configured with the corresponding encryption key. The context could alternatively or additionally be established on the basis of the user key and/or provisioning key.

Furthermore, in this arrangement, the aforementioned predetermined criterion for selecting one of the clipboards accessible by the application may include an indication as to which of the clipboards is accessible by the further application, thereby enabling the application to securely share data with the further application.

In a second exemplary embodiment there is provided a method of controlling clipboard operations on a user device, the user device comprising an application that has been provided by an application provisioning entity, the application having access to a first clipboard of a first type, to which data can be transferred and/or from which data can be retrieved by a further, different, application on the user device, wherein the application is configured with an encryption key for the transfer of data to and/or retrieval of data from a second clipboard of a second, different, type, the encryption key being associated with the application provisioning entity, the method comprising controlling the transfer of data to and/or retrieve data from the second clipboard by the application via the encryption key on the basis of a predetermined criterion.

In a third exemplary embodiment there is provided a user device comprising: at least one processor; and at least one memory comprising computer program code and a plurality of applications, a first clipboard of a first type which is accessible by at least some of the plurality of applications and a second clipboard of a second, different type, the second clipboard being configured with an encryption parameter, at least one application having a first state in which the application is enabled to access the second clipboard and a second state, different to the first state, the at least one memory and the computer program code being configured to, with the at least one processor, cause the user device to: encrypt the data on the basis of the encryption parameter in response to receiving a first request from the application to transfer data; and provide the encrypted data to the second clipboard, wherein subsequent access to the second clipboard is prevented for any application in the second state.

Specifically, an application in the first state is configured with the encryption parameter for use in accessing the second clipboard, whereas an application in the second state is not configured with the encryption parameter and as a consequence is unable to access the second clipboard. Accordingly, data maintained by the second clipboard is encrypted on the basis of the corresponding encryption parameter, and as a consequence prevents subsequent access by any application in the second state. That being the case, the user device minimizes risk of a data leak by restricting access to the second clipboard and encrypting data maintained thereby.

In response to receiving a configuration message corresponding to a different application from a remote entity, the user device may configure the different application into the first state, thereby enabling the different application to access the second, or restricted, clipboard.

The application may have access to a plurality of the second clipboards, in which case the user device causes selection of one of the second clipboards in response to a request from the application to transfer data. The selection of a particular second clipboard may be performed on the basis of a predetermined criterion. The predetermined criterion may, for example, comprise one or more policies specified by a corresponding application provisioning entity.

In response to a request from the application to retrieve data, the user device may cause determination of a timestamp associated with one or more data items maintained by at least one of the clipboards of the first or second type, and select one of the clipboards on the basis of the determination. Subsequently, a data item is retrieved from the selected clipboard. Thus, applications are not restricted to retrieving data items from the clipboard of the second type; rather, data items are retrieved on the basis of an associated temporal property.

The user device may cause an identifier associated with the second clipboard to be encrypted on the basis of a predetermined parameter, and maintains an association between the encrypted identifier and the second clipboard. In this way, a rogue application can be prevented from deducing an identifier corresponding to the second clipboard on the basis of a sniffing attack, in which the rogue application monitors communication between an application and an application execution environment. This is because the predetermined parameter is independent of the application that is using the second clipboard.

In a fourth exemplary embodiment there is provided a method of controlling clipboard operations on a user device, the user device comprising: a plurality of applications; a first clipboard of a first type which is accessible by at least some of the plurality of applications; and a second clipboard of a second, different type, the second clipboard being configured with an encryption parameter, at least one application having a first state in which the application is enabled to access the second clipboard and a second state, different to the first state, the method comprising: encrypting the data on the basis of the encryption parameter in response to receiving a first request from the application to transfer data; and providing the encrypted data to the second clipboard, wherein subsequent access to the second clipboard is prevented for any application in the second state.

In a fifth exemplary embodiment there is provided a user device comprising: at least one processor; and at least one memory comprising computer program code and a plurality of applications, a clipboard of a first type which is accessible by at least some of the plurality of applications and a plurality of clipboards of a second, different type, each of the clipboards of the second type being associated with a different encryption parameter, each encryption parameter being indicative of an application that is authorized to transfer data to and/or retrieve data from a corresponding clipboard of the second type, the at least one memory and the computer program code being configured to, with the at least one processor, cause the user device to: select a clipboard of the second type accessible by an application on the basis of a predetermined criterion in response to receiving a first request from the application to transfer data; encrypt data corresponding to the first request on the basis of the encryption parameter corresponding to the selected clipboard of the second type; and provide the encrypted data to the selected clipboard.

Accordingly, the user device causes selection of a clipboard of a second type on the basis of a predetermined criterion for placing data corresponding to a request to transfer data and encrypts data corresponding to the request on the basis of an encryption parameter corresponding thereto. In this way, an appropriate clipboard of the second type is selected in response to a request rather than placing data corresponding to a request on any accessible clipboard of the second type.

The user device may cause data corresponding to a request to be placed on the open clipboard if none of the clipboards of the second type are accessible. Accordingly, data corresponding to a request may be placed on a restricted clipboard if accessible, but in exceptional circumstances, data may be placed on the open clipboard, which is accessible by at least some of the applications. The user device may additionally cause data corresponding to a request to be placed on the open clipboard if the data is not confidential.

In a sixth exemplary embodiment there is provided a method of controlling clipboard operations on a user device, the user device comprising: a plurality of applications; a clipboard of a first type which is accessible by at least some of the plurality of applications; and a plurality of clipboards of a second, different type, each of the clipboards of the second type being associated with a different encryption parameter, each encryption parameter being indicative of an application that is authorized to transfer data to and/or retrieve data from a corresponding clipboard of the second type, the method comprising: selecting a clipboard of the second type accessible by an application on the basis of a predetermined criterion in response to receiving a first request from the application to transfer data; encrypting data corresponding to the first request on the basis of the encryption parameter corresponding to the selected clipboard of the second type; and providing the encrypted data to the selected clipboard.

In a seventh exemplary embodiment there is provided an apparatus for controlling clipboard operations on a user device remote therefrom, the user device comprising: a plurality of applications; a first clipboard of a first type accessible by at least some of the applications; and at least one second clipboard of a second, different type, the second clipboard being associated with an encryption parameter, wherein the encryption parameter is indicative of an application that is authorized to transfer data to and/or retrieve data from a corresponding the second clipboard, the apparatus comprising a processing system comprising a processor and a memory configured to cause the apparatus to selectively provision the encryption parameter to the application, whereby to enable the application to transfer data to and/or retrieve data from the second clipboard.

Accordingly, a remote apparatus may control access to a clipboard of the second type. In this way, an enterprise network or an application provisioning repository may actively control access to clipboards of the second type on user devices. In this regard, the apparatus may further provision one or more policies for controlling clipboard operation of an application on the user device.

In an eighth exemplary embodiment there is provided a method of controlling clipboard operations on a user device by an entity remote therefrom, the user device comprising: a plurality of applications; a first clipboard of a first type accessible by at least some of the applications; and at least one second clipboard of a second, different type, the second clipboard being associated with an encryption parameter, the encryption parameter being indicative of an application that is authorized to transfer data to and/or retrieve data from a corresponding the second clipboard, the method comprising selectively provisioning the encryption parameter to the application, whereby to enable the application to transfer data to and/or retrieve data from the second clipboard.

The seventh and eighth exemplary embodiments are most conveniently implemented by a server device. Embodiments also include a computer program comprising a set of instructions, which, when executed by the apparatus, cause the apparatus to perform a method according to the eighth embodiment. According to further aspects of the present invention the apparatus may be embodied as a single computing device, or as a distributed system comprising a cluster of computing devices. The apparatus is configured, either as a single device, or a cluster of devices, to perform a method corresponding to the aforementioned functionality, and indeed the device or devices are configured with computer code capable of performing the corresponding steps.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
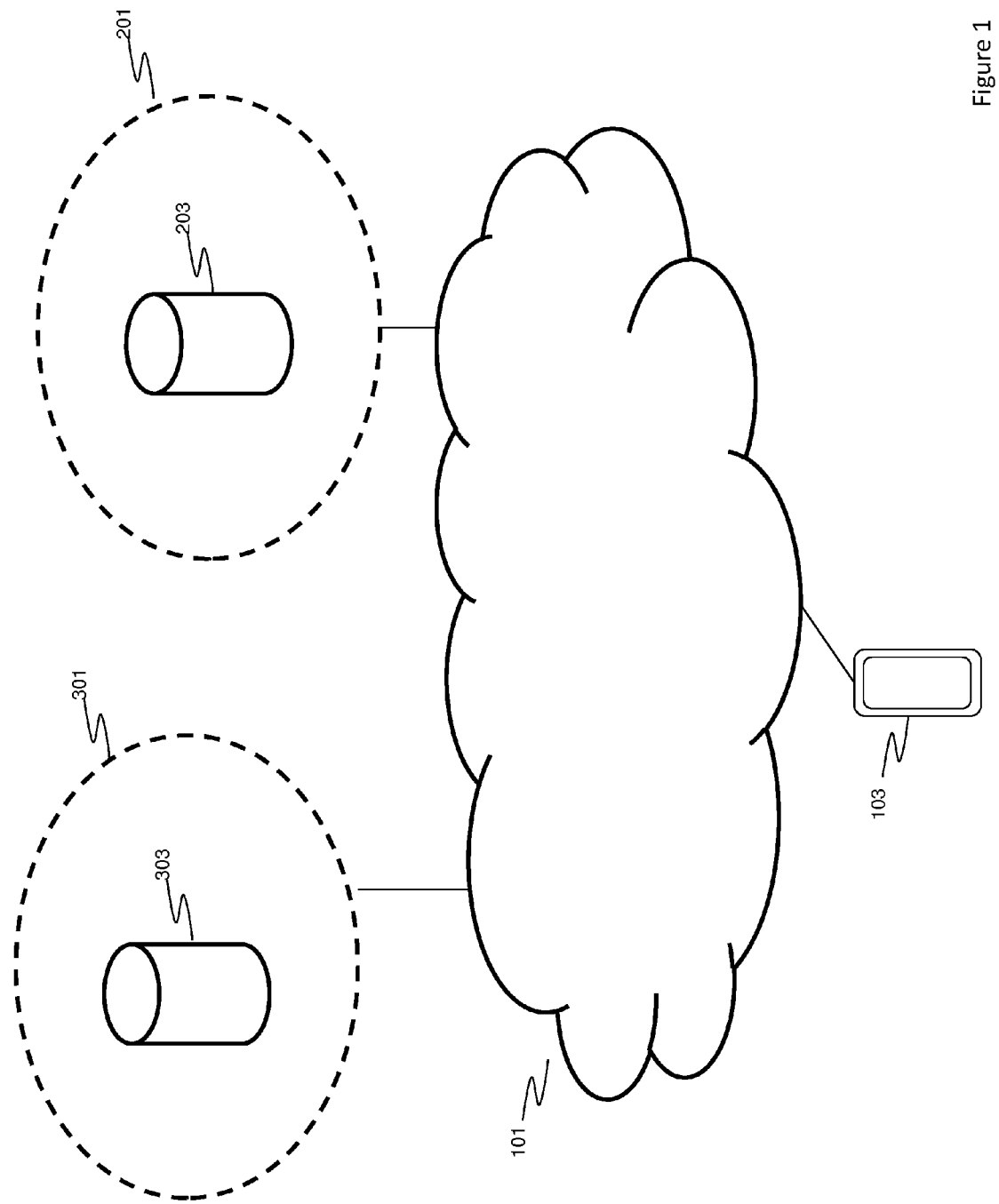
FIG. 1 is a simplified block diagram of a communication network within which embodiments operate.

Embodiments of the invention are concerned with managing access to clipboards, or pasteboards, on user devices. In particular examples, embodiments are concerned with providing secure clipboards that are either accessible exclusively by an application and/or context-based clipboards that are associated with a context and are accessible by one or more applications that share a contextual relationship. The processing involved in management of clipboards is described in detail below, but first an overview of a conventional network environment within which the embodiments of the invention operate will be described with reference to FIG. 1, which is a block diagram illustrating a communications network 101 which enables a user device 103 to communicate with domains 201 and 301 (hereinafter referred to as first and second domains).

The communication network 101 is configured to enable packet communication between the user device 103 and the first and second domains 201 and 301, either directly or via a mediating network entity, such as a proxy server (not shown). The first and second domains 201 and 301 could, for example, be a private network, such as an enterprise or organizational network. The first domain 201 may comprise an application provisioning entity 203 which provides applications to enable user devices to communicate with services, such as a database (not shown), provided by the first domain 201 and/or by a further domain, such as the second domain 301. That being the case, the applications provisioned by the application provisioning entity 203 may have access to sensitive or confidential information. The second domain 301 may comprise an application provisioning repository 303, which comprises one or more applications for download by user devices. The application provisioning repository 303 may comprise some or all applications provisioned by the application provisioning entity 203 and/or a further application provisioning repository (not shown). For completeness, it is noted that the application provisioning repository 303 may alternatively be located within the first domain 201.

Without limitation, the user device 103 may be a remote desktop computer, a smart phone such as an iPhone™, a tablet computer such as an iPad™ or a laptop. In a preferred arrangement, such as where the user device 103 is a mobile computing device, the communication network 101 is operatively connected to a mobile network (not shown) to route packets to/from the user device 103, in which case the mobile network provides the user device 103 with wireless network connectivity. Without limitation, the mobile network can include Global System for Mobile Communications (GSM), General Packet Radio Service (GPRS), Enhanced Data rates for GSM Evolution (EDGE), Universal Mobile Telecommunications System (UMTS), 3G, Wi-Fi, Unlicensed Mobile Access and Generic Access Network. The components and entities forming the mobile network are well known to those skilled in the art.

The user device 103 may be equipped with a plurality of applications, some of which may be provisioned by the application provisioning entity 203 and/or may be downloaded via the application provisioning repository 303. The applications provisioned by the application provisioning entity 203 may be configured with confidential information pertaining to the domain 201 or may have access to confidential information via one or more services accessible thereby.

The user device 103 additionally comprises a clipboard of a first type that is accessible by at least some of the applications thereon (hereinafter referred to as "open clipboard"). The open clipboard is an unrestricted clipboard and is generally accessible by applications without any restrictions.

The open clipboard temporarily retains data transferred by an application by means of a cut or copy operation, and provides the retained data to the same or a different application in response to a paste operation. As the open clipboard is accessible by applications on the user device 103, any sensitive or confidential information transferred to the open clipboard by an application may be obtained by an unauthorized application; consequentially the open clipboard poses a risk of a data leak.

Conventional methods adopted to address this problem involve application provisioning entities, such as the application provisioning entity 203, configuring one or more applications provisioned thereby to disable clipboard functionality, and thus preventing them from transferring data to the open clipboard. However, such a restriction blocks access to the open clipboard, which is an annoyance to users who habitually make use of the clipboard functionality.

In an alternative arrangement, some application provisioning entities configure their applications to encrypt data transferred to the open clipboard, thereby preventing a data leak. However, data including encrypted data placed on the open clipboard can be irretrievably removed by any application, and as a consequence poses a risk of data loss.

In a further known arrangement, operating systems such as Apple™ iOS™ provide a private clipboard that can be invoked by any application by assigning a unique identifier. Access to a private clipboard is restricted to applications that have knowledge of its unique identifier, thereby enabling applications to share sensitive information. However, the contents of a private clipboard will be at risk if its corresponding identifier is discovered by a further application.

Figure 2:
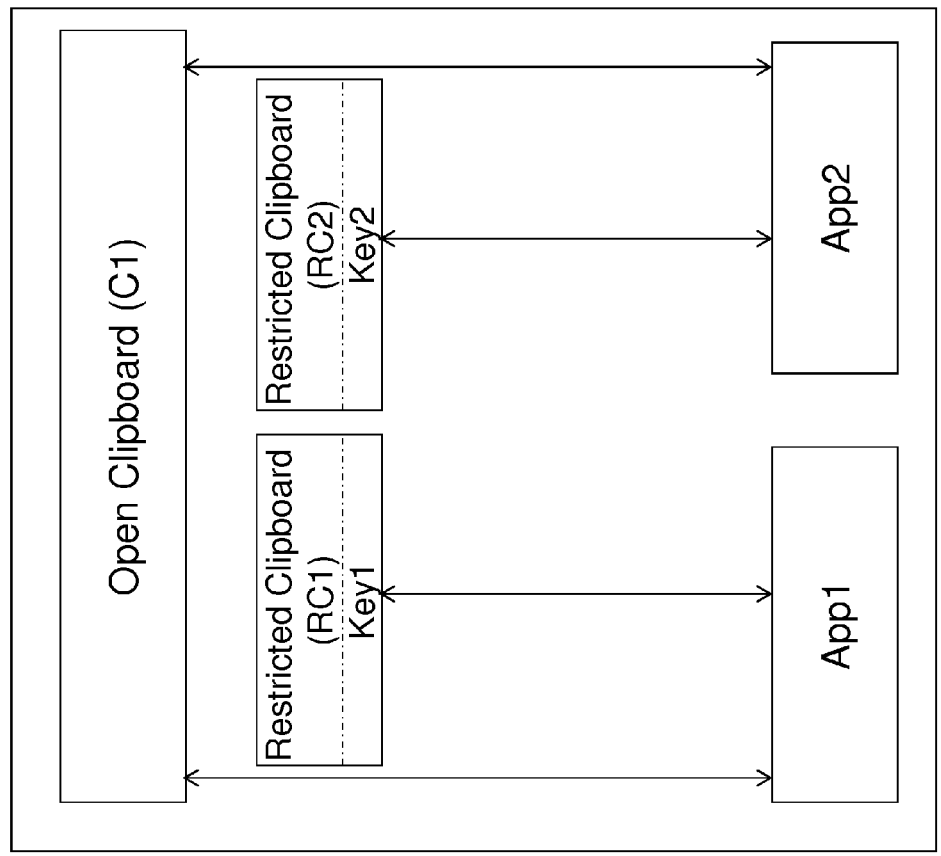
FIG. 2 is a block diagram that illustrates communication between various elements according to embodiments.

Referring to FIG. 2, an embodiment according to the invention will now be described. In this embodiment, an application App1 on the user device 103 is configured with an encryption parameter, such as an encryption key Key1, which may be a hash or a digital certificate, for transfer to and/or retrieval of data from its respective restricted clipboard RC1. The restricted clipboard RC1 is a clipboard of a second type that is different to the aforementioned clipboard of the first type, i.e. the open clipboard C1, and is accessible only by the application App1. In effect, the restricted clipboard RC1 is a private clipboard, and the application transfers data to and retrieves data from it via the encryption key Key1. In at least some arrangements, the encryption key Key1 may be associated with the application provisioning entity 203 by which the application App1 was provisioned. In alternative arrangements, and as will be explained further below, the encryption parameter may additionally or alternatively be associated with a user or a corresponding application provisioning repository from which application App1 was downloaded. That being the case, embodiments provide a private clipboard and configure a key for transfer of data to and/or retrieval of data from the private clipboard.

Data items maintained on the restricted clipboard RC1 are encrypted on the basis of the encryption key Key1, and as a consequence, even if an unapproved or a malicious application were able to obtain one or more data items, it would not be able to decrypt them without the encryption key Key1. Therefore, embodiments minimize the risk of a data leak. As will be described further below, embodiments enable a remote entity, such as the application provisioning entity 203, to control access to restricted clipboards associated therewith by selectively configuring applications with or remotely provisioning the encryption key Key1. Consequentially, enterprise networks can permit their applications to use clipboard functionality without any risks of a data leak.

For completeness, it is noted that applications on the user device 103 may be provisioned by a plurality of application provisioning entities. For example, an application App2 may be provisioned by a different application provisioning entity (not shown) associated with the second domain 301, and accordingly may be configured with a different encryption parameter, such as an encryption key Key2, a hash or a digital certificate, for transfer to and/or retrieval of data from a restricted clipboard RC2. Thus, embodiments provide a separate restricted clipboard for at least some of the applications on the user device 103, and enable corresponding application provisioning entities to control access thereto. That being the case, the user device 103 may selectively allow application App1 to transfer data to and/or retrieve data from one of the clipboards C1 and RC1, or the user device 103 may selectively allow application App2 to transfer data to and/or retrieve data from one of the clipboards C1 and RC2 on the basis of a predetermined criterion, which may, for example, be a policy specified by a corresponding application provisioning entity.

The restricted clipboards RC1 and RC2 can be any combination of hardware and/or software (executing on hardware) configured to provide clipboard functionality to selected applications on the basis of an associated context. As described above, the restricted clipboards RC1 and RC2 are configured with corresponding encryption keys Key1 or Key2, respectively, for use in controlling access thereto.

In at least some arrangements, the application App1 may have a first operating state in which the application App1 is enabled to transfer data to and/or retrieve data from its corresponding restricted clipboard RC1 via the encryption key Key1, and a second state in which the application App1 is not enabled to transfer data to and/or retrieve data from its corresponding restricted clipboard RC1 via the encryption key Key1. Specifically, if the application App1 is configured with the encryption key Key1, then it will be considered to be in the first operating state. In this regard, the application provisioning entity 203 corresponding to the application App1 may transmit a message comprising the encryption key Key1 thus configuring the application App1 into the first state.

The application App1 can invoke clipboard functions, such as cut, copy or paste, in relation to the restricted clipboard RC1 by means of an Application Programming Interface (API) provided therefor. Alternatively, an application execution environment or an application wrapper, which acts as an interface between an application and the application execution environment, may selectively or indiscriminately intercept requests for clipboard functions from the application App1, and cause the requested clipboard functionality to be processed in accordance with the embodiments by either the open clipboard C1 or the restricted clipboard RC1.

Figure 3:
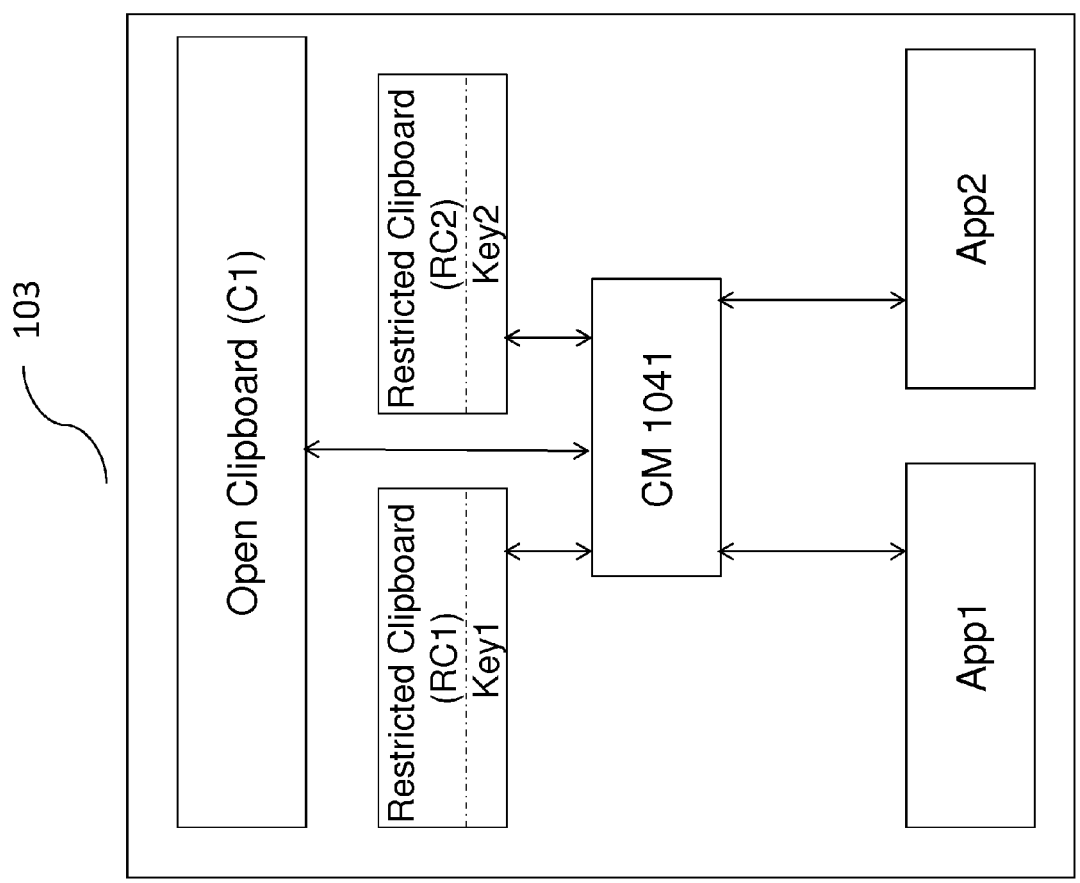
FIG. 3 is a block diagram that illustrates communication between various elements according to embodiments.

Referring to FIG. 3, in an alternative arrangement, requests for clipboard functions from the applications App1 and App2 may be intercepted by a clipboard manager 1041, either alone or in conjunction with the application wrapper or the application execution environment. In this case, the clipboard manager 1041 acts as an interface between the open and restricted clipboards C1, RC1 and RC2, and causes the requested clipboard functionality to be processed in accordance with the embodiments by one of the clipboards C1, RC1 and RC2.

Figure 4:
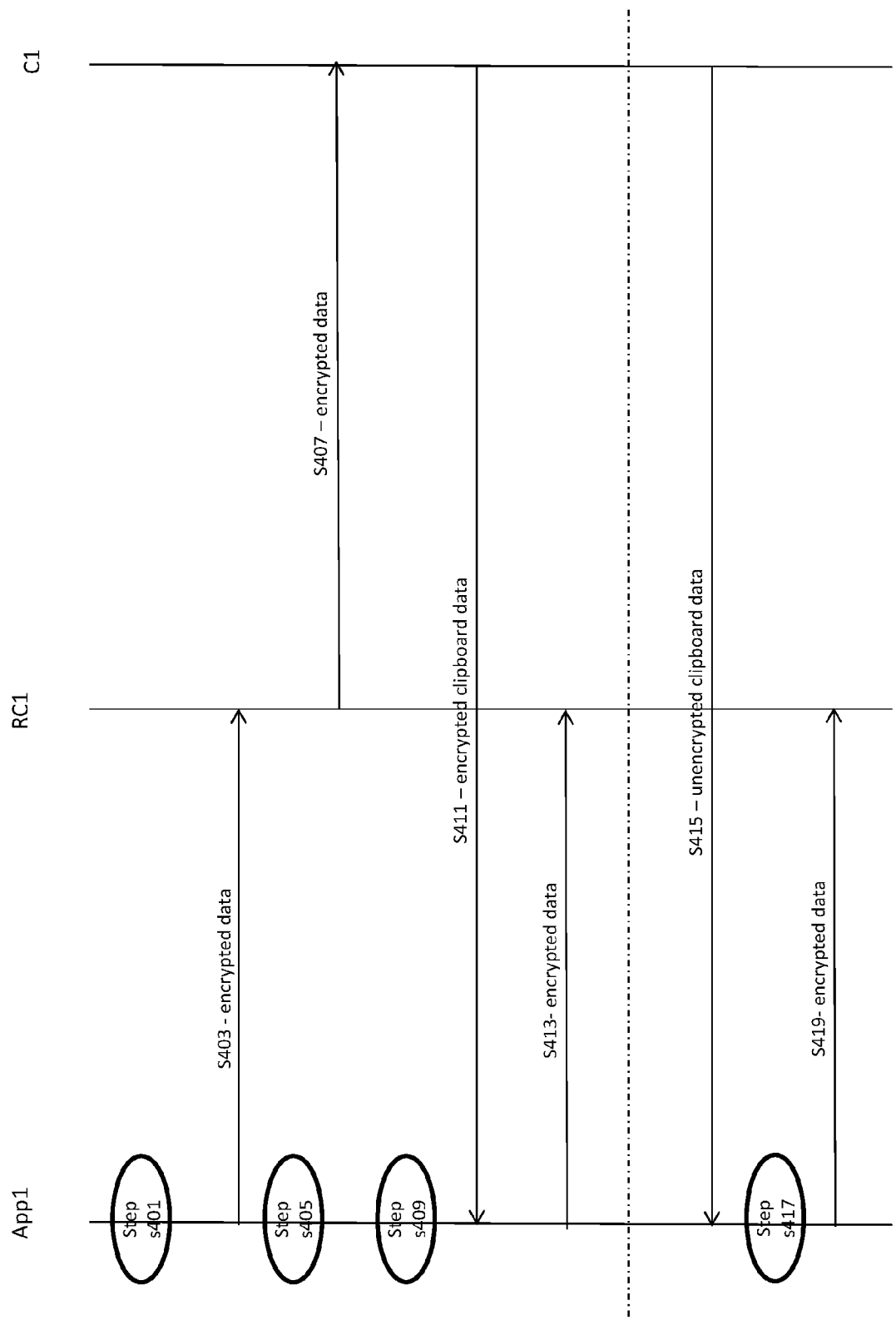
FIG. 4 is a logic flow diagram that illustrates the operation of a method, and a result of computer program instructions embodied on a computer readable memory, in accordance with exemplary embodiments.

An overview of the steps performed in response to a clipboard operation by the application App1 will now be described with reference to FIG. 4. In response to receiving a request from application App1 to transfer data, the application execution environment, or application App1, or the application wrapper and/or the configuration manager 1041 may encrypt data on the basis of the aforementioned encryption key Key1, i.e. the encryption parameter corresponding to the restricted clipboard RC1 (s401). The encrypted data is then provided to the restricted clipboard RC1 (s403).

In at least some arrangements, the applications App1 can execute in a foreground operational state and a background operational state. For example, when the application App1 is active, it can be considered to be in the foreground operational state. In response to an indication that the application App1 is transiting into the background operational state, the application execution environment, or application App1, or the application wrapper and/or the clipboard manager 1041 may associate an identifier with one or more of the encrypted data item(s) maintained by its corresponding restricted clipboard RC1 (s405), and subsequently transfer at least some of the encrypted data items from the restricted clipboard RC1 to the open clipboard C1 on the basis of a predetermined rule (s407). The predetermined rule may, for example, include one or more of: a policy specified by the corresponding application provisioning entity 203; a timestamp associated with the encrypted data item(s) maintained by the restricted clipboards RC1; and a data type associated with the encrypted data item(s) maintained by the restricted clipboards RC1.

In this way application App1 is able to retrieve the encrypted data item(s) from the open clipboard C1 when it transits into the foreground operational state. Specifically, when the application App1 transits into the foreground operational state (s409), the application execution environment, or application App1, or the application wrapper and/or the clipboard manager 1041 may retrieve the encrypted data item(s) on the basis of the associated identifier from the open clipboard C1 (s411), and transfer the encrypted data item(s) to its corresponding restricted clipboard RC1 (s413).

The application execution environment, or application App1, or the application wrapper and/or the clipboard manager 1041 may alternatively or additionally retrieve one or more data items transferred by a different application. In this case, the application App1 may determine whether the retrieved data item(s) are encrypted on the basis of the encryption key Key1 (s415). If they are encrypted, then the retrieved data item(s) are transferred to the restricted clipboard RC1. If not, then the application execution environment, or application App1, or the application wrapper and/or the configuration manager 1041 encrypts the retrieved data item(s) on the basis of the encryption key Key1 (s417), and then transfers them to the restricted clipboard RC1 (s419).

For completeness it will be noted that the encrypted data item may alternatively or additionally be retrieved by a further, different, application from the open clipboard C1. However, the further application will only be able to decrypt retrieved encrypted data items if it is configured with the encryption key Key1. That being the case, embodiments enable secure sharing of data items between applications that share a context, such as the applications provisioned by the same application provisioning entity and configured with a corresponding key.

In at least some arrangements, the application App1 may have access to a second restricted clipboard, and be configured with a user key for transfer of data to and/or retrieval of data therefrom. The application App1 may additionally or alternatively have access to a third restricted clipboard, and be configured with a provisioning key associated with a corresponding application provisioning repository for transfer of data and/or retrieval of data therefrom. In this case, the application App1 may determine which of the clipboards C1, RC1, the second restricted clipboard and/or the third restricted clipboard is accessible thereby, and selectively allow transfer of data to and/or retrieval of data from one of the accessible clipboards on the basis of a predetermined criterion.

The predetermined criterion may, for example, include one or more of: a policy specified by the corresponding application provisioning entity 203; an indication whether one of the accessible clipboards comprises at least one data item; and a timestamp associated with data items maintained by at least one of the accessible clipboards.

It will be noted that the restricted clipboard RC1, the second restricted clipboard and/or the third restricted clipboard may be allocated virtual and/or physical memory, and in this case the different restricted clipboards will be distinguished on the basis of the corresponding encryption parameter.

Figure 5:
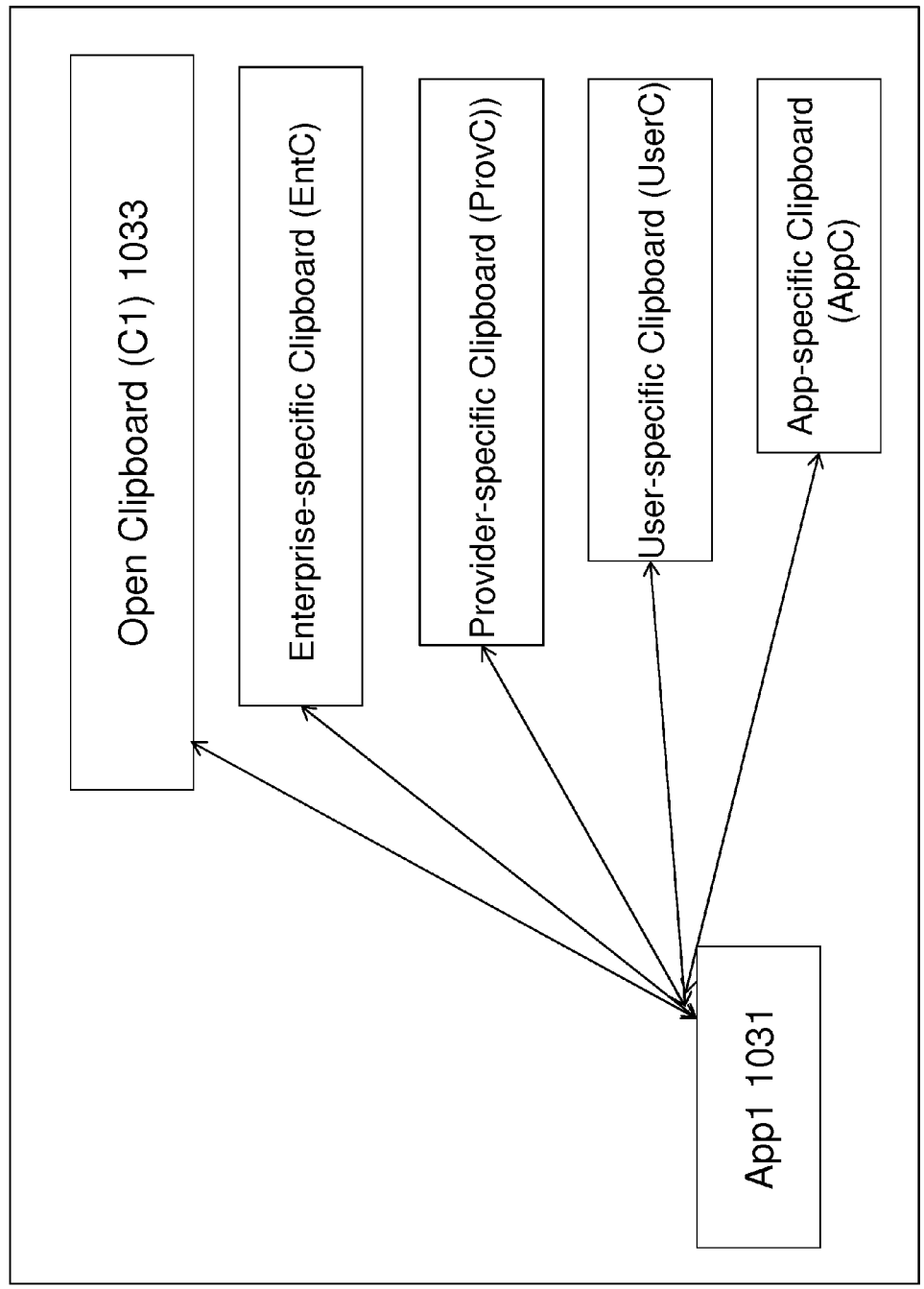
FIG. 5 is a block diagram that illustrates available clipboards on a user device according to embodiments.

With reference to FIG. 5, as described above the restricted clipboards RC1 and/or RC2 may, for example, be a private clipboard associated with a specific application, such as the application App1, and may only be accessible by modules of the application for internal use. Alternatively, if the application is a constituent element of a suite of applications, such as Microsoft™ Office™, the clipboards may be accessible by one or more applications from the same application suite. In this case, the restricted clipboards RC1 and/or RC2 is/are an application-specific private restricted clipboard AppC, and are accessible by an application or a suite of applications that are configured with a corresponding key.

In an alternative arrangement, the restricted clipboard RC1 may be shared between applications with a contextual relationship. In this case, each of the applications sharing the contextual relationship will be configured with the encryption key Key1 for transfer of data to or retrieval of data from the restricted clipboard RC1. Accordingly, this arrangement provides a restricted clipboard that is shared between applications with a contextual relationship, such as applications provisioned by the application provisioning entity 203 and configured with the corresponding encryption key.

Referring again to FIG. 5, the restricted clipboards RC1 and/or RC2 may be user-specific restricted clipboards UserC, and accessible by one or more applications associated with a given user and which are configured with a corresponding user key. For completeness, it is noted that the user associated with an application may change from time to time and, accordingly, an application may have access to a different user-specific restricted clipboard UserC at different times. Applications may be configured with one or more user keys for transfer of data to and/or retrieval of data from a corresponding user-specific restricted clipboard UserC, or the user keys may be provisioned dynamically when, for example, a user association changes.

The restricted clipboards RC1 and/or RC2 may additionally or alternatively be associated with an application provisioning repository, such as the application provisioning repository 303. In this case, the restricted clipboards RC1 and/or RC2 may be considered provider-specific restricted clipboards ProvC, which are accessible by one or more applications downloaded from a same application provisioning repository, such as the application provisioning repository 303. Applications may be configured with a provisioning key associated with a corresponding application provisioning repository for transfer to and/or retrieval of data from a corresponding provider-specific clipboard ProvC.

The restricted clipboards RC1 and/or RC2 may additionally or alternatively be associated with an enterprise network. In this case, the restricted clipboards RC1 and/or RC2 may be considered enterprise-specific restricted clipboards EntC, which are accessible by applications associated with a given enterprise network. Applications associated with an enterprise network may be configured with an enterprise key for transfer to and/or retrieval of data from a corresponding enterprise-specific restricted clipboard EntC.

Thus, in addition or as an alternative to application-specific clipboards, embodiments provide context-specific restricted clipboards, each of which is accessible by a different set of applications. In at least some arrangements, an encryption key or parameter corresponding to a restricted clipboard may be indicative of the applications App1 and/or App2 that are authorized to transfer to and/or retrieve data therefrom.

Figure 6:
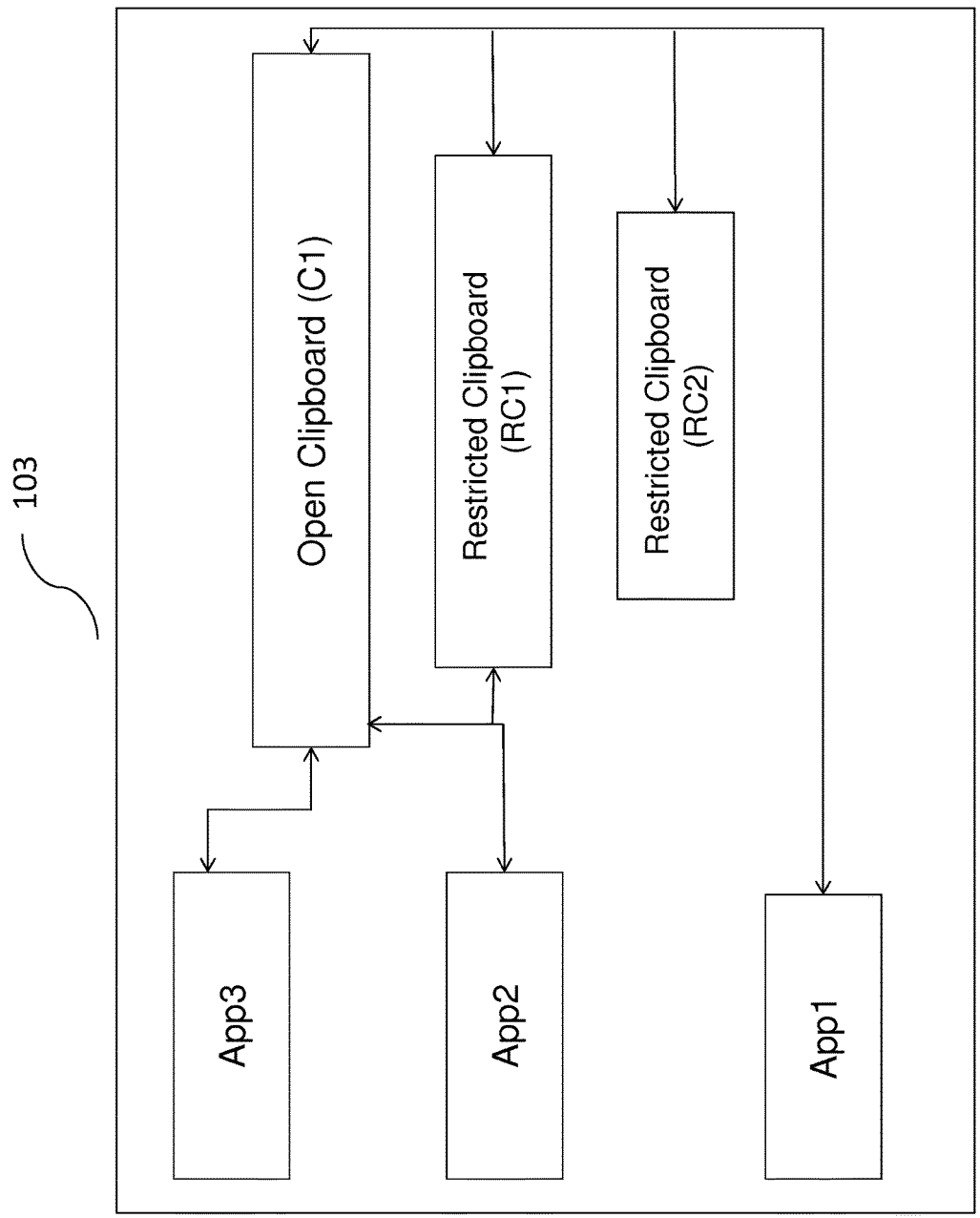
FIG. 6 is a block diagram that illustrates communication between various elements according to embodiments.

Referring to FIG. 6, in an exemplary arrangement, application App1 may have access to the clipboards C1, RC1 and RC2, and application App2 may have access to the clipboards C1 and RC1, whereas an application App3 may only have access to the open clipboard C1. As will be explained further below, in the event that an application is transferring data to a clipboard for retrieval by a further application, it may transfer data to one of the clipboards C1, RC1 or RC2 on the basis of an indication as to which of the clipboards C1, RC1 and RC2 are accessible by the further application. For example, in at least some arrangements, in response to a request for a clipboard operation from application App1 or App2, the requesting application App1 or App2, or the application execution environment, or the application wrapper and/or the configuration manager 1041 may determine which of the clipboards C1, RC1 and/or RC2 are accessible by application App1 or App2. Subsequently, the relevant entity may selectively allow data to be transferred to and/or retrieved from one of the accessible clipboards C1, RC1 or RC2 on the basis of the aforementioned predetermined criterion. In an alternative arrangement, the user device 103 may maintain a record comprising data indicative of the clipboards C1, RC1 and/or RC2 that are accessible by each of the applications App1 and App2, and selectively allow transfer to and/or retrieval of data from one of the accessible clipboards on the basis of the record.

Figure 7:
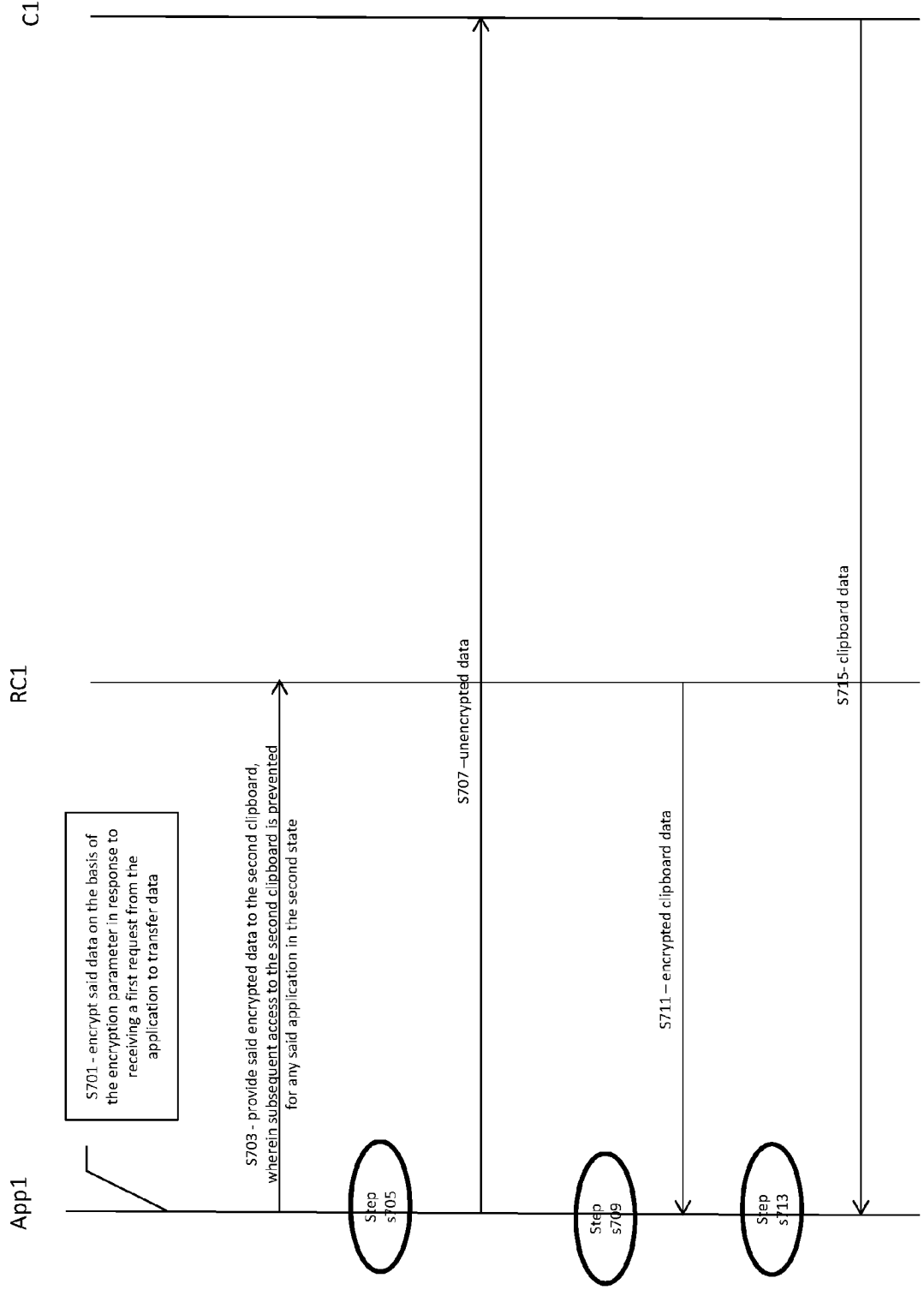
FIG. 7 is a logic flow diagram that illustrates the operation of a method, and a result of computer program instructions embodied on a computer readable memory, in accordance with exemplary embodiments.

An overview of the steps performed in response to receiving a request from application App1 to transfer data, i.e. a cut or a copy clipboard request, will now be explained with reference to FIG. 7. Initially application App1 is configured in the aforementioned first state in relation to the restricted clipboard RC1, which is to say that App1 is enabled to access the restricted clipboard RC1. In response to receiving a request from application App1 to transfer data, the application execution environment, or application App1, or the application wrapper and/or the clipboard manager 1041 may encrypt data on the basis of the aforementioned encryption key Key1, i.e. the encryption parameter corresponding to the restricted clipboard RC1 (s701). The encrypted data is then provided to the restricted clipboard RC1 (s703).

Considering briefly application App2, and assuming App2 is initially in the aforementioned second state in relation to the restricted clipboard RC1, App2 would be prevented from accessing the encrypted data placed thereon by application App1. However, if application App2 were subsequently configured into the first state in relation to the restricted clipboard RC1, then it would have access to the encrypted data placed thereon by application App1. As will be explained further below, application App2 may be configured into the first state by provisioning the encryption key Key1 thereto.

In an alternative arrangement, in response to a request to transfer data, i.e. a cut or a copy clipboard request from application App1 (s705), the data corresponding to the request may be placed on the open clipboard C1 on the basis of the aforementioned predetermined criterion (s707). This may occur in the event that application App1 needs to share data with a further application, such as application App2, which does not have access to the restricted clipboard RC1. For completeness, it is to be noted that clipboard operation requests from an application that does not have access to any of the restricted clipboards RC1 and RC2 will be fulfilled on the basis of the open clipboard C1. In at least some arrangements, any data items placed on the open clipboard C1 may be associated with temporal restrictions, such as the data item may be only maintained on the open clipboard C1 for a number of minutes, e.g. 1, 2, 5 minutes.

In response to a request from application App1 to retrieve data, i.e. a paste clipboard operation request (s709 or 713), data maintained by the open clipboard C1 or one of the restricted clipboards RC1 or RC2 may be retrieved on the basis of the aforementioned predetermined criterion for provisioning to application App1. For example, application App1 may be provisioned with a data item from one of the restricted clipboards RC1 and RC2 if at least one of the restricted clipboards RC1 and RC2 are accessible thereby and/or it is configured to retrieve data items only from a restricted clipboard (s711). Alternatively, application App1 may be provisioned with a data item from the open clipboard C1 if it is the newest data item available on all the accessible clipboards C1, RC1 and/or RC2 (s715). Particularly, a data item with a most recent timestamp may be provisioned to application App1, regardless of whether the data item is retrieved from the open clipboard C1 or one of the restricted clipboards RC1 or RC2.

In an exemplary arrangement, application App1 may have access to both the restricted clipboards RC1 and RC2. In this case, application App1, the application execution environment, the application wrapper and/or the clipboard manager 1041 may cause application App1 to transfer to and/or retrieve data from the restricted clipboards RC1 and/or RC2 on the basis of predetermined criterion such as an operational state associated with the respective application App1 or App2. For example, if application App1 is in a state in which it is handling confidential information, it may be prevented from using the open clipboard C1. In this case, application App1 may additionally or alternatively be prevented from using one or more of the restricted clipboards RC1 and/or RC2. This may occur in the event that an enterprise network configures its applications to exclusively use a corresponding enterprise-specific clipboard EntC for clipboard functionality.

Alternatively or additionally, the predetermined criterion may comprise one or more policies specified by a corresponding application provisioning entity, such as the aforementioned entity 203, or a corresponding application provisioning repository, such as the aforementioned repository 303. Such policies may be configured prior to provisioning of the applications App1 and/or App2 to the user device 103, or they may be subsequently provisioned to the user device 103 for use in controlling clipboard access by the applications App1 and/or App2.

Alternatively or additionally, the predetermined criterion may comprise an attribute associated with a data item corresponding to a request for transfer of data. The attribute may, for example, be based on data type, size and/or an indication that the data comprises a predetermined sequence.

In cases where an application, such as application App1, needs to transfer data to a clipboard for retrieval by a further application, such as application App2, the predetermined criterion may additionally or alternatively comprise an indication as to which of the restricted clipboards RC1 and/or RC2 are accessible by App2. For example, if both the restricted clipboards RC1 and RC2 are accessible by application App1, then it may place data for retrieval by application App2 on one of the restricted clipboards RC1 or RC2, which is accessible by application App2. Alternatively, if, for example, none of the restricted clipboards RC1 and RC2 is accessible to application App2, then application App1 may place data on the open clipboard C1 for retrieval by application App2.

In response to receiving a request from application App1 or App2 for retrieving data, the requesting application App1 or App2, the application execution environment, the application wrapper and/or the clipboard manager 1041 may determine a timestamp associated with one or more data items maintained by at least one of the accessible clipboards C1, RC1 and/or RC2. Subsequently, an accessible clipboard C1, RC1 or RC2 is selected in dependence on the timestamp determination, and a data item therefrom is retrieved for provisioning to the requesting application App1 or App2. As described above, the clipboard C1, RC1 or RC2 which has a data item with the most recent timestamp may be selected.

In the event that the selected clipboard is a restricted clipboard, the retrieved data item may be decrypted on the basis of a corresponding encryption key by the application execution environment, the application wrapper and/or the clipboard manager 1041 for provisioning to the requesting application App1 or App2. In alternative arrangements, the retrieved data item may be provisioned to the requesting application App1 or App2 in encrypted format, and the requesting application App1 or App2 may decrypt the encrypted data item.

In at least some arrangements, at least one of the restricted clipboards RC1 and/or RC2 is associated with an identifier, and the user device 103, the application execution environment, the application wrapper and/or the clipboard manager 1041 encrypts the identifier associated the restricted clipboards RC1 and/or RC2 on the basis of a predetermined parameter. The predetermined parameter may, for example, comprise an identifier associated with a user, the user device 103 and/or the corresponding application App1 and/or App2. For example, an identifier corresponding to an enterprise-specific clipboard EntC may be encrypted on the basis of a corresponding enterprise credential. Subsequently, the user device 103, the application execution environment, the application wrapper and/or the clipboard manager 1041 may maintain an association between the encrypted identifier and its corresponding restricted clipboard RC1 or RC2, thus avoiding maintaining the identifier in clear text format, which is vulnerable to sniffing attacks, in which a malicious application may monitor communication to find out the identifier.

Figure 8:
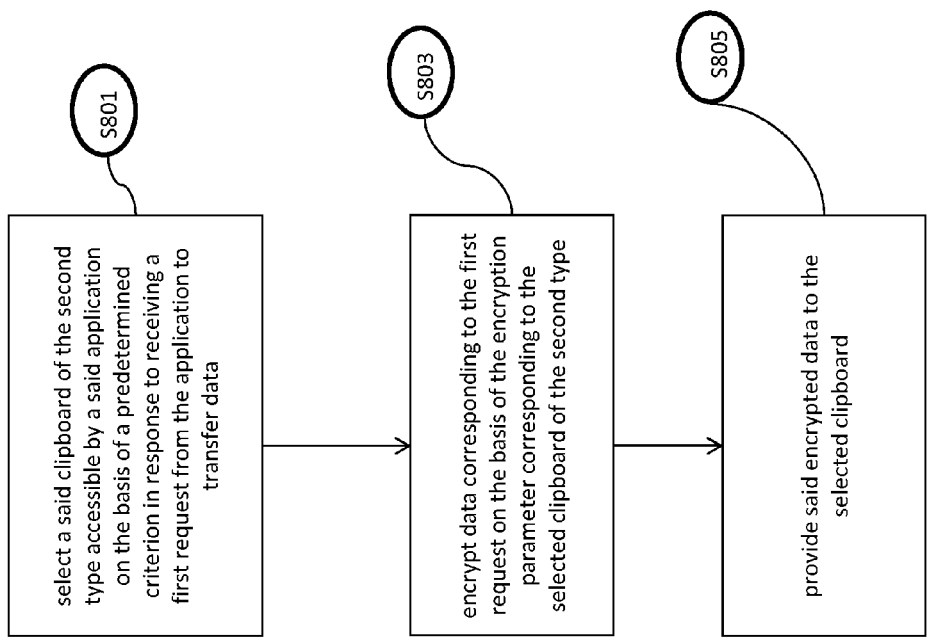
FIG. 8 is a logic flow diagram that illustrates the operation of a method, and a result of computer program instructions embodied on a computer readable memory, in accordance with exemplary embodiments.

Turning to FIG. 8, in at least some arrangements, in response to receiving a request from an application, such as application App1 or App2, to transfer data, the requesting application App1 or App2, the application execution environment, the application wrapper and/or the clipboard manager 1041 may select one of the restricted clipboards RC1 or RC2 accessible by the requesting application App1 or App2 on the basis of the aforementioned predetermined criterion (s801). Subsequently, data corresponding to the request is encrypted on the basis of the encryption key Key1 or Key2 corresponding to the selected restricted clipboard RC1 or RC2 (s803), and the encrypted data is provided to the selected clipboard RC1 or RC2 (s805). Thus, embodiments select an appropriate restricted clipboard and cause data corresponding to clipboard function requests to be securely placed on the selected clipboard.

In cases where the data corresponding to the request to transfer data comprises at least two data items, the requesting application App1 or App2, the application execution environment, the application wrapper and/or the clipboard manager 1041 may select a different restricted clipboard RC1 or RC2 in respect of at least one of the data items. Such a selection may be based on the aforementioned predetermined criterion. Subsequently, the requesting application App1 or App2, the application execution environment, the application wrapper and/or the clipboard manager 1041 may encrypt the data item on the basis of the encryption parameter corresponding to the different restricted clipboard RC1 or RC2, and provide the encrypted data item for maintenance by the different restricted clipboard RC1 or RC2. Thus, embodiments may cause different data items to be placed on different restricted clipboards.

In an exemplary arrangement and as described above, in the event that none of the restricted clipboards RC1 and RC2 is accessible by application App1 or App2 that is requesting transfer of data, then data corresponding to request may be transferred to the open clipboard C1.

Figure 9:
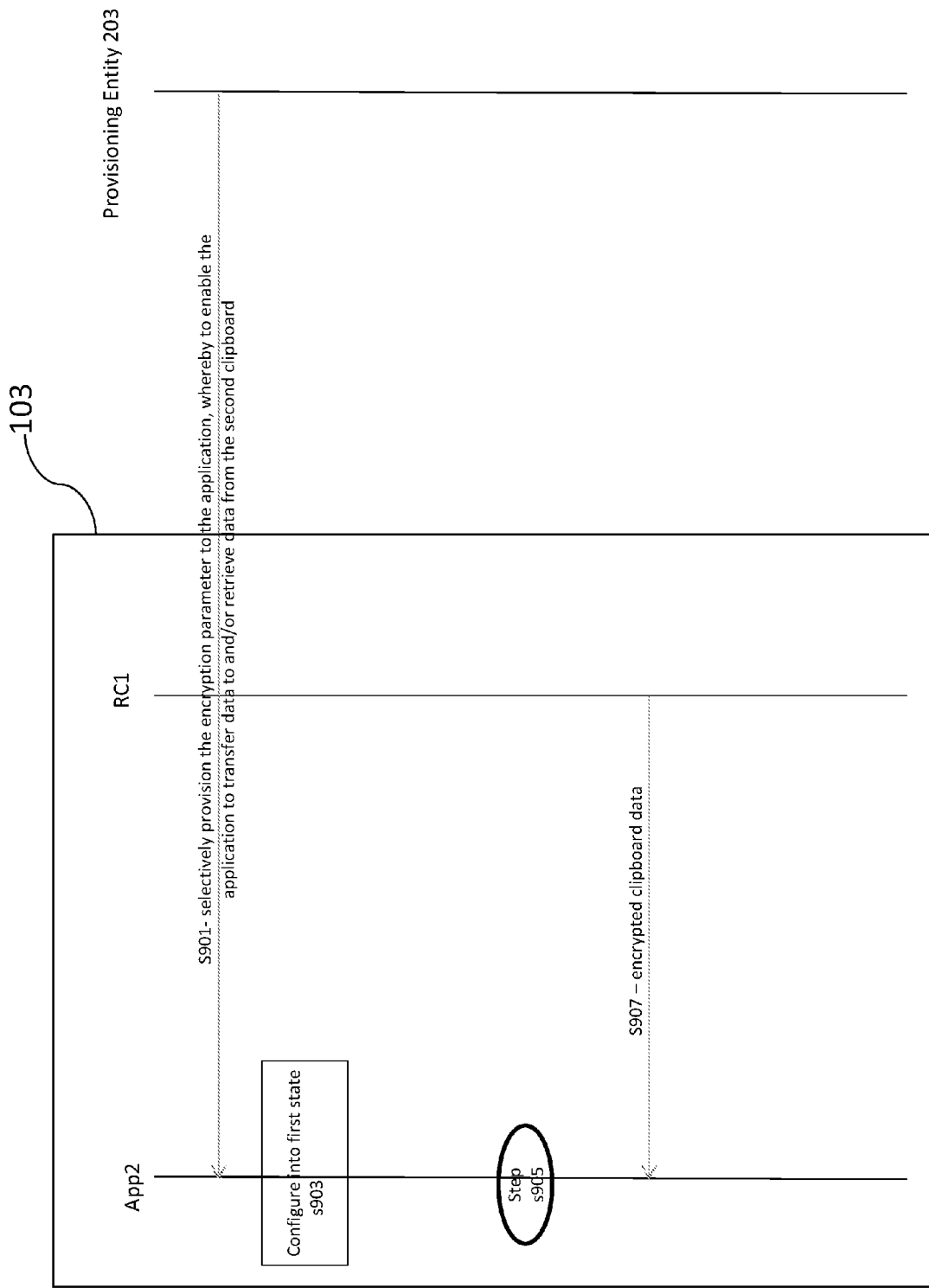
FIG. 9 is a flow diagram that illustrates the various steps performed by various elements according to embodiments.

Configuration of application App2 into the first state in which it is able to transfer data to and/or retrieve data from the restricted clipboard RC1 will now be described with reference to FIG. 9, for the situation in which the restricted clipboard RC1 is associated with the application provisioning entity 203. The application provisioning entity 203 may selectively provision a configuration message comprising the encryption key Key1 for receipt by application App2 in order to configure application App2 into the first state in relation to the restricted clipboard RC1, and as a consequence enable it to transfer data to and/or retrieve data from the restricted clipboard RC1 (s901). The application provisioning entity 203 may transmit the configuration message for receipt by application App2 of its own accord, or in response to a request therefor from application App2 or the user device 103. In response to receiving the message, the application App2, the application execution environment, the application wrapper and/or the clipboard manager 1041 may configure application App2 into the first state in relation to the restricted clipboard RC1 (s903). Subsequently and in response to a request to retrieve data, i.e. a paste clipboard function request (s905), application App2 is provided with the encrypted data placed on the restricted clipboard RC1 by application App1 at s703 (s907). In at least some arrangements, the application provisioning entity 203 may maintain an association between the encryption key Key1 and the corresponding restricted clipboard RC1 in order to control access thereto.

In effect, a remote entity may control access to a given context-based restricted clipboard by selectively provisioning an encryption key associated therewith to one or more applications. In this way, entities such as application provisioning entities, enterprise networks, application provisioning repositories and remote device managers can control processing of clipboard function requests from an application; in particular embodiments provide a new level of control of application behavior as regards remote application management application policies. In this regard, the remote entity, such as the application provisioning entity 203, may provision one or more policies for controlling clipboard function requests corresponding to an application on the user device 103. Such policies may, for example, be specified by a corresponding application provisioning entity or a corresponding application provisioning repository.

Figure 10:
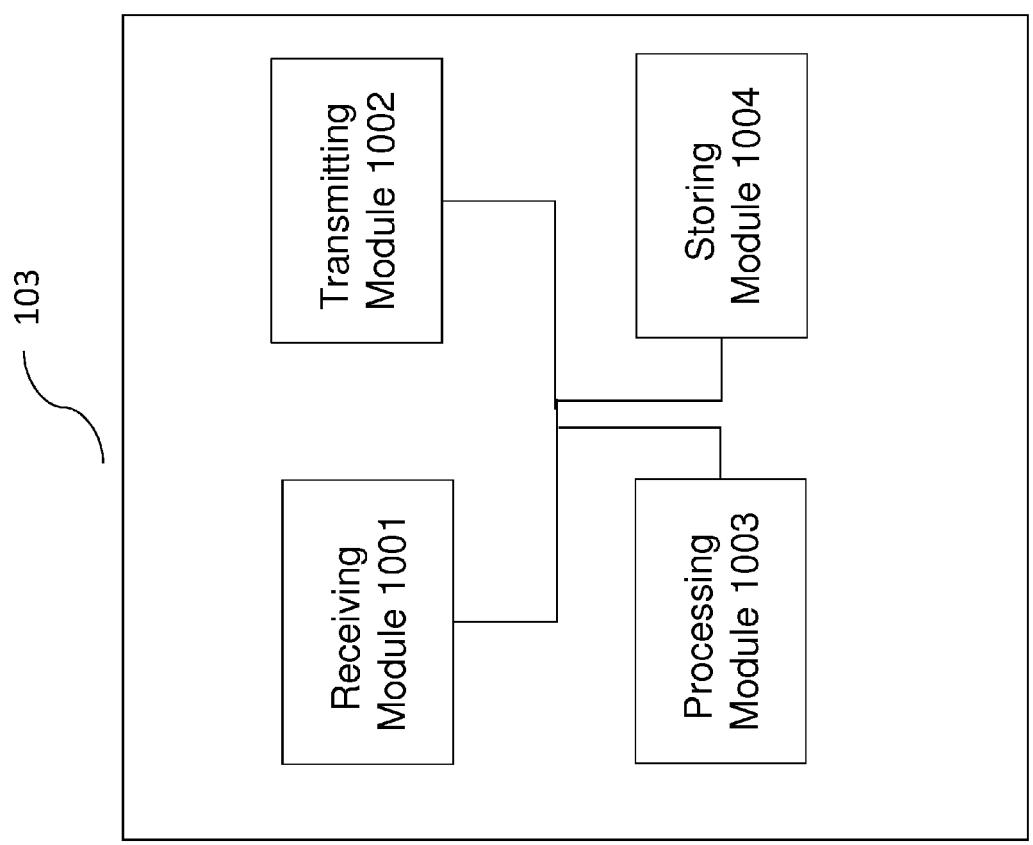
FIG. 10 is a simplified block diagram of a user device, which is an exemplary electronic device for use in practicing the exemplary embodiments.

FIG. 10 is a functional block diagram of an exemplary user device 103. As shown, the user device 103 may comprise a processing module 1003, a storing module 1004, a receiving module 1001 and a transmitting module 1002. The processing module 1003 may correspond at least in some aspects to, for example, a processor as discussed herein. The storing module 1004 may correspond at least in some aspects to, for example, a memory as discussed herein. The receiving module 1001 may correspond at least in some aspects to, for example, a processor, a receiver and/or a transceiver as discussed herein. The transmitting module 1002 may correspond at least in some aspects to, for example, a processor, a transmitter and/or a transceiver as discussed herein.

Figure 11:
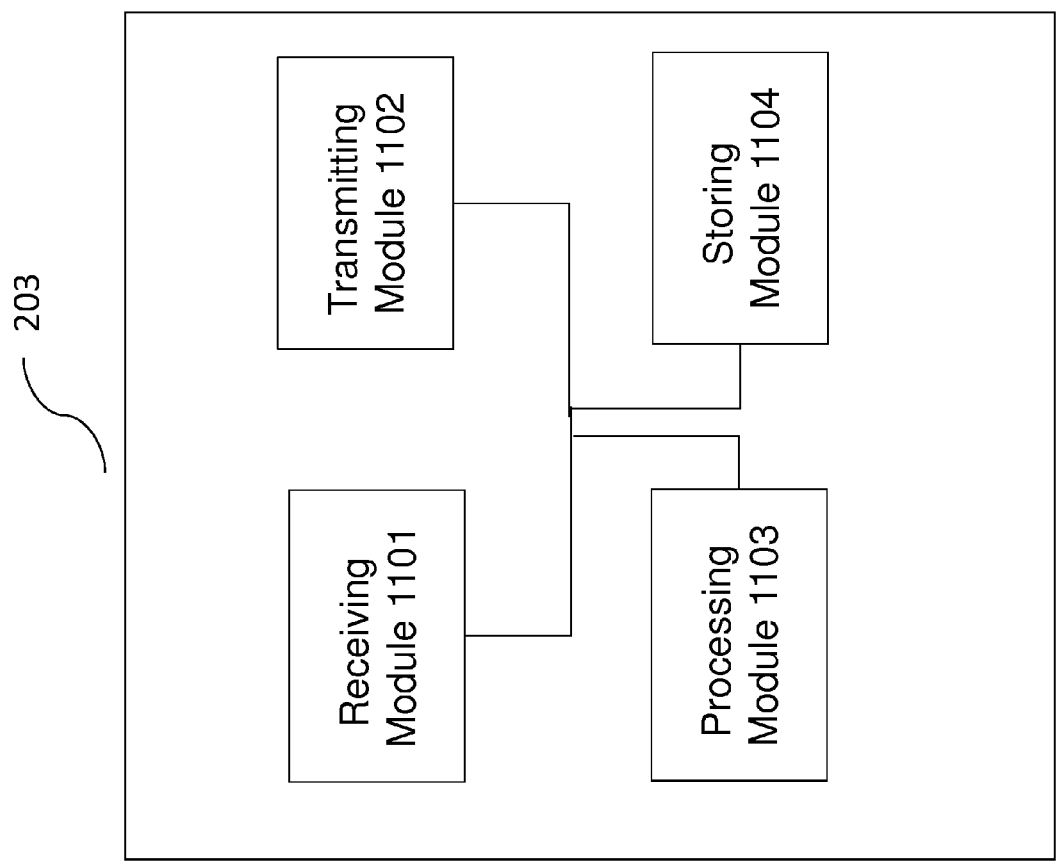
FIG. 11 is a simplified block diagram of a network element, which is an exemplary electronic device for use in practicing the exemplary embodiments.

FIG. 11 is a functional block diagram of an exemplary application provisioning entity 203. As shown, the application provisioning entity 203 may comprise a processing module 1103, a storing module 1104, a receiving module 1101 and a transmitting module 1102. The processing module 1103 may correspond at least in some aspects to, for example, a processor as discussed herein. The storing module 1104 may correspond at least in some aspects to, for example, a memory as discussed herein. The receiving module 1101 may correspond at least in some aspects to, for example, a processor, a receiver and/or a transceiver as discussed herein. The transmitting module 1102 may correspond at least in some aspects to, for example, a processor, a transmitter and/or a transceiver as discussed herein.

The functionality of the modules of FIGS. 10 and 11 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

For example, the modules may be implemented, at least in part, as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

More particularly, the user device 103 and/or the application provisioning entity 203 in accordance with some of the above embodiments may be configured to operate according to the above some embodiments by executing computer programs held in computer readable media. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray™ disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The embodiments described herein are to be understood as illustrative examples of the invention. Further embodiments of the invention are envisioned. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A user device comprising:
    at least one processor;
    at least one memory comprising computer program code; and
    a first application that has been provisioned by an application provisioning entity, the application provisioning entity being remote from the user device, the first application having access to a first clipboard of a first type, to which data is configured to be transferred and from which data is configured to be retrieved by a further, different, second application on the user device, wherein the first application is configured with an encryption key for a transfer of data to and a retrieval of data from a second clipboard of a second, different type, the encryption key for the first application is configured by the application provisioning entity that has provisioned the first application, the first application encrypts a data item based on the encryption key and transfers the encrypted data item to the second clipboard, wherein the first clipboard, the second clipboard, the first application, and the second application are stored in the at least one memory of the user device, the first clipboard is accessible by both the first application and the second application, and the second clipboard is accessible by the first application,
    wherein the first application is configured to execute in a foreground operational state or a background operational state, and in response to an indication that the first application is transiting into the background operational state, the first application is configured to associate an identifier with the encrypted data item and transfer the encrypted data item from the second clipboard to the first clipboard on a basis of a predetermined rule; and
    wherein the at least one memory and the computer program code being configured to, with the at least one processor, cause the user device to control the transfer of data to and retrieval of data from the second clipboard by the first application via the encryption key.

2. The user device according to claim 1, wherein the predetermined rule comprises one or more of the following:
    a policy specified by the application provisioning entity;
    a timestamp associated with the encrypted data item; and
    a data type associated with the encrypted data item.

3. The user device according to claim 1, wherein, in response to an indication that the first application has transited into the foreground operational state, the first application is configured to:
    retrieve the encrypted data item on a basis of the associated identifier from the first clipboard; and
    transfer the encrypted data item to the second clipboard.

4. The user device according to claim 1, wherein, in response to an indication that the first application has transited into the foreground operational state, the first application is configured to:
    retrieve a data item from the first clipboard;
    determine whether the retrieved data item has been encrypted on a basis of the encryption key;
    in dependence on the determination, encrypt the retrieved data item on the basis of the encryption key; and
    transfer the encrypted data item to the second clipboard.

5. The user device according to claim 1, wherein the first application has access to a third clipboard of the second type and is configured with a user key for transfer of data to and retrieval of data from the third clipboard, the user key being associated with a user.

6. The user device according to claim 5, wherein the first application has access to a fourth clipboard of the second type and is configured with a provisioning key for transfer of data to and retrieval of data from the fourth clipboard, the provisioning key being associated with an application provisioning repository from which the first application was downloaded.

7. The user device according to claim 6, wherein, the user device comprises a processing system configured to:
    determine which of the clipboards is accessible by the first application; and
    selectively allow transfer of data to and retrieval of data from one of the accessible clipboards on a basis of a predetermined criterion.

8. The user device according to claim 7, wherein the predetermined criterion comprises one or more of the following:
    a policy specified by the application provisioning entity;
    an indication of whether a clipboard comprises at least one data item; and
    a timestamp associated with data items maintained by at least one of the accessible clipboards.

9. A method of controlling clipboard operations on a user device, the user device comprising a first application that has been provisioned by an application provisioning entity remote from the user device, the first application having access to a first clipboard of a first type, to which data is configured to be transferred and from which data is configured to be retrieved by a further, different, second application on the user device, wherein the first application is configured with an encryption key for a transfer of data to and a retrieval of data from a second clipboard of a second, different type, the encryption key for the first application is configured by the application provisioning entity that has provisioned the first application, the first application encrypts a data item based on the encryption key and transfers the encrypted data item to the second clipboard, the first clipboard, the second clipboard, the first application, and the second application being stored in at least one memory of the user device, the first clipboard being accessible by both the first application and the second application, the second clipboard being accessible by the first application, and the method comprising: controlling the transfer of data to and retrieval of data from the second clipboard by the first application via the encryption key on a basis of a predetermined criterion; and wherein the first application is configured to execute in a foreground operational state or a background operational state, and in response to an indication that the first application is transiting into the background operational state, the method further comprising: associating an identifier with the encrypted data item and transferring the encrypted data item from the second clipboard to the first clipboard on a basis of a predetermined rule.

10. The method according to claim 9, wherein the predetermined rule comprises one or more of the following:
a policy specified by the application provisioning entity;
a timestamp associated with the encrypted data item; or
a data type associated with the encrypted data item.

11. The method according to claim 9, the method further comprising:
responsive to an indication that the first application has transited into the foreground operational state:
retrieving the encrypted data item on a basis of the associated identifier from the first clipboard; and
transferring the encrypted data item to the second clipboard.

12. The method according to claim 9, the method further comprising:
in response to an indication that the first application has transited into the foreground operational state:
retrieving a data item from the first clipboard;
determining whether the retrieved data item has been encrypted on a basis of the encryption key;
in dependence on the determination, encrypting the retrieved data item on the basis of the encryption key; and
transferring the encrypted data item to the second clipboard.

13. The method according to claim 9, wherein the first application has access to a third clipboard of the second type and is configured with a user key for transfer of data to and retrieval of data from the third clipboard, the user key being associated with a user, the method comprising selectively allowing the first application to transfer data to and retrieve data from the third clipboard on the basis of the predetermined criterion.

14. The method according to claim 13, wherein the first application has access to a fourth clipboard of the second type and is configured with a provisioning key for transfer of data to and retrieval of data from the fourth clipboard, the provisioning key being associated with an application provisioning repository from which the first application was downloaded, the method further comprising: selectively allowing the first application to transfer data to and retrieve data from the fourth clipboard on the basis of the predetermined criterion.

15. The method according to claim 14, the method further comprising:
determining which of the clipboards is accessible by the first application; and
selectively allowing transfer of data to and retrieval of data from one of the accessible clipboards on the basis of the predetermined criterion.

16. The method according to claim 9, wherein the predetermined criterion comprises one or more of the following:
a policy specified by the application provisioning entity;
an indication of whether a clipboard comprises at least one data item; or
a timestamp associated with data items maintained by at least one of the accessible clipboards.

17. A tangible, non-transitory computer-readable medium comprising a set of instructions, which, when executed by a user device, cause the user device to perform a method of controlling clipboard operations on the user device,
the user device comprising a first application that has been provisioned by an application provisioning entity remote from the user device, the first application having access to a first clipboard of a first type, to which data is configured to be transferred and from which data is configured to be retrieved by a further, different, second application on the user device, wherein the first application is configured with an encryption key for a transfer of data and a retrieval of data from a second clipboard of a second, different type, the encryption key for the first application is configured by the application provisioning entity that has provisioned the first application, the first application encrypts a data item based on the encryption key and transfers the encrypted data item to the second clipboard, the first clipboard, the second clipboard, the first application, and the second application being stored in at least one memory of the user device, the first clipboard being accessible by both the first application and the second application, the second clipboard being accessible by the first application, and wherein the first application is configured to execute in a foreground operational state or a background operational state, and in response to an indication that the first application is transiting into the background operational state, the first application is configured to associate an identifier with the encrypted data item and transfer the encrypted data item from the second clipboard to the first clipboard on a basis of a predetermined rule; and the user device comprising a processing system arranged to cause the user device to control the transfer of data to and retrieval of data from the second clipboard by the first application via the encryption key on a basis of a predetermined criterion.

18. The user device according to claim 1, wherein a clipboard of the first type is an open clipboard that is accessible without an encryption key, and a clipboard of the second type is a restricted clipboard that is accessible via an encryption key.

* * * * *